(12) United States Patent
Allard et al.

(10) Patent No.: US 9,070,140 B2
(45) Date of Patent: Jun. 30, 2015

(54) SYSTEM AND METHOD FOR MEASURING AND IMPROVING THE EFFICIENCY OF SOCIAL MEDIA CAMPAIGNS

(76) Inventors: Paul Allard, Montréal (CA); Tom Liacas, Montréal (CA)

( * ) Notice: Subject to any disclaimer, the term of this patent is extended or adjusted under 35 U.S.C. 154(b) by 164 days.

(21) Appl. No.: 13/545,079

(22) Filed: Jul. 10, 2012

(65) Prior Publication Data

US 2013/0166648 A1 Jun. 27, 2013

Related U.S. Application Data

(60) Provisional application No. 61/578,470, filed on Dec. 21, 2011.

(51) Int. Cl.
*G06F 15/16* (2006.01)
*G06Q 30/02* (2012.01)

(52) U.S. Cl.
CPC .................... *G06Q 30/0242* (2013.01)

(58) Field of Classification Search
CPC ................. H04L 67/22; G06Q 50/01
USPC ........................................... 709/231
See application file for complete search history.

(56) References Cited

U.S. PATENT DOCUMENTS

| | | | |
|---|---|---|---|
| 2007/0121843 A1* | 5/2007 | Atazky et al. | 379/114.13 |
| 2007/0294281 A1 | 12/2007 | Ward et al. | |
| 2010/0023300 A1 | 1/2010 | Farry et al. | |
| 2010/0218128 A1 | 8/2010 | Bonat et al. | |
| 2011/0054991 A1 | 3/2011 | Orellana et al. | |
| 2011/0072052 A1* | 3/2011 | Skarin et al. | 707/794 |
| 2011/0087534 A1 | 4/2011 | Strebinger et al. | |
| 2011/0264496 A1 | 10/2011 | Engstrom et al. | |
| 2012/0036018 A1 | 2/2012 | Feliciano et al. | |
| 2012/0158477 A1 | 6/2012 | Tennenholtz et al. | |
| 2012/0158518 A1 | 6/2012 | Benyamin et al. | |
| 2012/0191543 A1 | 7/2012 | Dharmaji | |

FOREIGN PATENT DOCUMENTS

| | | |
|---|---|---|
| WO | WO 2010011637 Y | 10/2010 |
| WO | WO 2011146776 A | 11/2011 |

OTHER PUBLICATIONS

International Search Authority, International Search Report (ISR), Oct. 15, 2012, 4 pages.

* cited by examiner

*Primary Examiner* — Wing F Chan
*Assistant Examiner* — Andrew Woo
(74) *Attorney, Agent, or Firm* — Benoit & Cote Inc.

(57) ABSTRACT

A system and method for measuring the efficiency of social media campaigns. The system collects searchable activity data of members of a social network and processes this data locally to extract interaction data happening on the profile page of the social media campaign on the social network. The interaction data is then weighed in accordance with its type. The system may also determine an effort score representing a monetary value of the profile page based on the volume of contribution by the owners of the social media campaign. The efficiency score may then be determined based on a relationship between the number of interactions, the weight associated with each interaction, and the effort score.

18 Claims, 5 Drawing Sheets

SYSTEM AND METHOD FOR MEASURING AND IMPROVING THE EFFICIENCY OF SOCIAL MEDIA CAMPAIGNS

BACKGROUND (a) Field

The subject matter disclosed generally relates to a method and system for measuring the efficiency of social media campaigns.

(b) Related Prior Art

There is a need for a system and method which determine the efficiency of social media campaigns and recommend actions to improve the efficiency of these campaigns.

SUMMARY

In an aspect there is provided a computer-implemented method for measuring an efficiency of a social media campaign (campaign) presented on a profile page on a social network, comprising: collecting searchable activity data of members having profile pages on the social network from a remote server of the social network using a communication network; extracting, from the activity data, interaction data representing audience feedback occurring on the profile page of the campaign, the profile page of the campaign being one of the profile pages on the social network; assigning a weight to each interaction based on a type of the interaction; estimating an effort score for the campaign, the effort score representing a monetary value spent in developing the campaign; determining an efficiency score of the campaign based on a relationship between the number of interactions, the weight associated with each interaction, and the effort score; presenting the efficiency score of the campaign on a display for viewing.

In an embodiment the method may further comprise determining an efficiency score for the campaign on more than one social network; assigning a weight to each social network; and determining a global efficiency score for the campaign, the global efficiency score representing an overall efficiency of the campaign using the efficiency score and the weight associated with each social network.

In a further embodiment, the method may further comprise determining, using the activity data of all members, an efficiency score for all members in an industry to which the social campaign belongs; determining an industry efficiency score by averaging the efficiency scores of all members of the industry; presenting the industry efficiency score concurrently with the campaign efficiency score on a display for viewing.

In an embodiment, upon detecting that the campaign efficiency score is below a predetermined threshold, the method may comprise: collecting ranking rules of the social network from the remote server of the social network using the communication network; mapping the ranking rules to the activity data; in view of the mapping, generating one or more recommendations for improving a campaign's visibility and/or efficiency score on the social network.

The method may also comprise collecting ranking rules of the social network from the remote server of the social network using the communication network; analyzing the activity data in view of the ranking rules; in view of the analyzing, generating one or more recommendations for improving a campaign's visibility and/or efficiency score on the social network.

In an embodiment, the analyzing may comprise mapping the ranking rules to the activity data.

The method may further comprise re-ordering the ranking rules in view of the weight assigned to each rule, whereby the activity data is analyzed in view of the most relevant rule first.

The method may further comprise performing the steps of extracting, assigning, estimating, determining and presenting in real time, in response to receiving a member request of campaign efficiency score.

In an embodiment the method may comprise performing the steps of extracting, assigning, estimating, determining and presenting in real time, in response to receiving a member request of campaign efficiency score.

In a further embodiment the method may also comprise measuring of the efficiency is provided as a Software as a Service (SaaS) to a remote member using a communication network.

The interaction data may comprise actions performed by other members on the profile page, said actions comprising at least one of: viewing, liking, disliking, commenting, and sharing content of the social campaign.

The activity data may include any one of: viewing, liking, disliking, commenting, sharing, posting new materials, updating profile, commenting on content outside of the social campaign profile page.

In an embodiment, the relationship is a ratio between the effort score and the sum of each interaction multiplied by its weight.

In another aspect, there is provided a system for measuring an efficiency of a social media campaign (campaign) presented on a profile page on a social network, comprising:
 an input adapted to collect searchable activity data of members having profile pages on the social network from a remote server of the social network using a communication network;
 a memory for storing the collected activity data for processing;
 an intelligence module comprising a processor having access to a memory having stored thereon computer readable instructions which when executed by the processor cause the processor to:
  extract, from the activity data, interaction data representing audience feedback occurring on the profile page of the campaign;
  assign a weight to each interaction based on a type of the interaction;
  estimate an effort score for the campaign, the effort score representing a monetary value spent in developing the campaign;
  determine an efficiency score of the campaign based on the number of interactions, the weight associated with each interaction, and the effort score;
 an output adapted to send the efficiency score to a remote user for displaying on a display device.

The intelligence module may be adapted to
determine an efficiency score for the campaign on more than one social network;
assign a weight to each social network; and
determine a global efficiency score for the campaign, the global efficiency score representing an overall efficiency of the campaign using the efficiency score and the weight associated with each social network.

The intelligence module may also be adapted to:
collect ranking rules of the social network from the remote server of the social network using the communication network;
analyze the activity data in view of the ranking rules;

generate, in view of the analysis, one or more recommendations for improving a campaign's visibility and/or efficiency score on the social network.

In a further aspect, there is provided a computer-implemented method for measuring an efficiency of a social media campaign (campaign) presented on a profile page on a social network, comprising:

collecting searchable activity data of members having profile pages on the social network from a remote server of the social network using a communication network;

extracting, from the activity data, interaction data representing actions performed by other members on the profile page, the profile page of the campaign being one of the profile pages on the social network, the actions comprising at least one of: viewing, liking, disliking, commenting, and sharing content of the social campaign;

assigning a different weight to each different interaction based on a type of the interaction;

estimating an effort score for the campaign, the effort score representing a monetary value spent in developing the campaign;

determining an efficiency score of the campaign based on a relationship between the number of interactions, the weight associated with each interaction, and the effort score;

collecting ranking rules of the social network from the remote server of the social network using the communication network;

mapping the ranking rules to the activity data;

in view of the mapping, generating one or more recommendations for improving a campaign's visibility and/or efficiency score on the social network; and sending the efficiency score of the campaign and the recommendations to a remote computing device.

In the following description a user/member may be interpreted as an individual or an entity that includes more than one person such as a company, firm or the like.

Furthermore, a social media campaign may include a wide range of campaigns ranging from personal profiles to commercial advertising campaign, to campaigns intended to raise awareness etc.

The ranking rules are rules that are set by the administration of the social networks to determine the visibility of the profile pages of the members on the social network. These rules differ between a website and the other and are changed periodically.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present document describes a system and a method for measuring the efficiency of social media campaigns. The system collects searchable activity data of members of a social network and processes this data locally to extract interaction data happening on the profile page of the social media campaign on the social network. The interaction data is then weighed in accordance with its type. The system may also determine an effort score representing a monetary value of the profile page based on the volume of contribution by the owners of the social media campaign. The efficiency score may then be determined based on a relationship between the number of interactions, the weight associated with each interaction, and the effort score.

Figure 1:
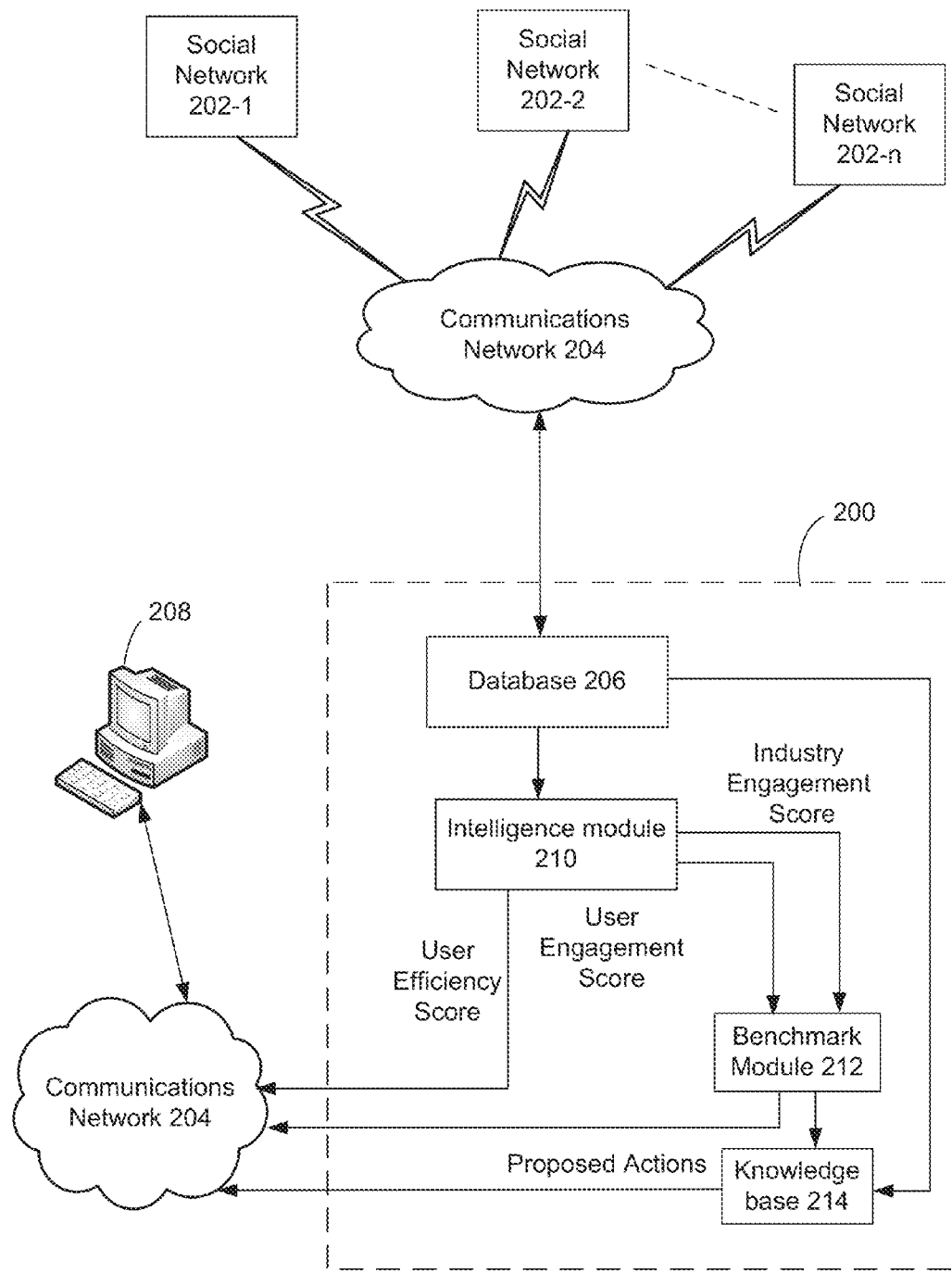
FIG. 1 is a block diagram of an exemplary system for measuring and improving the efficiency of social media campaigns, in accordance with an embodiment.

FIG. 1 is a block diagram of an exemplary system for measuring and improving the efficiency of social media campaigns, in accordance with an embodiment. The system may be accessed remotely over a communication network by a plurality of clients. The measuring and improving of the efficiency of social media campaigns may be offered as a Software as a Service (SaaS) in a cloud computing environment. An exemplary SaaS Environment is described hereinbelow.

As shown in FIG. 1, a system 200 collects activity data (statistical profile data that is publicly available) of members of one or more social media networks 202 over a communication network 204 such as the internet, or any other type of wired and/or wireless communication networks. Examples of social media networks include but are not limited to: Facebook, LinkedIn, Google analytics and Google related networks, Twitter, Foursquare, MySpace etc.

The system collects (scraps) the data from the remote servers of the social networks 202, processes the data locally and then provides the results to the user 208 over the communication network 204. In an embodiment, the user 208 has to open an account and create a user profile with the system 200. The user may link their profile with the system 200 to one or more accounts at one or more social media network 202.

The activity data may be obtained/updated in real time or regularly, for example, every few hours, daily, or weekly. The data collected from the different social networks 202 may be stored in a database 206 to be processed by an intelligence module 210. Using a proprietary algorithm, the intelligence module 210 processes the collected data to determine an individual user engagement score for the user with each social media network.

In a non-limiting example of implementation, the algorithm causes the system 200 to count interactions that happened between the user and his community on the campaign page/account. In an embodiment, each interaction count is given a weight that reflects how well the social media campaign has been received by the community (other users). For example: on Facebook, a "comment" is given more weight than a "like". In this case, pressing "like" is an indication that the users saw the message or the post or the article etc. on the other hand, if users make the effort to write a comment on the campaign page it means that the message of the campaign was thoroughly received by the users, or that the user is interested about the subject being advertised/posted.

It is to be noted that, in the present context, the activity data of the member includes all activities performed by the member and their connections on the member's profile page. By contrast, interaction data represents audience feedback e.g. actions that reflect feedback of other users on what the members have posted on their profile page and the response to the feedback. For instance, if the member writes an article and posts this article on their page. The article is considered an activity data, but not an interaction data. However, if one of the member of the audience presses "like" or "dislike" or writes a comment on the article, this would classify as interaction data.

The system 200 may determine an individual engagement score for the social campaign based on the number of interactions and the weight associated with each interaction. The individual engagement score represents a degree of engagement/use of the social campaign on a specific social media network.

In an embodiment, the system 200 may determine an effort score for each user with respect to each social network. The effort score is an estimated amount of money spent in developing the social media campaign. For instance, the system may estimate the amount of money by estimating the average time spent in using, developing, updating etc. the social media campaign. The system may take into consideration the frequency of visiting the account (logging in), and the volume of contribution and use of the social media campaign as reflected by 1). sharing links, articles, music, videos, etc.,
2). viewing and liking other people's links and comments,
3). posting new materials,
4). commenting on other people's content etc.
5). Any other actions reflecting engagement, depending on the social network specificities.

The system may then use the effort score to determine an efficiency score for the user by applying the user engagement score for a certain network against the effort score.

The system may also determine an average efficiency score for all users in the same industry/network. In an embodiment, once the individual efficiency score is determined, it is compared with the average efficiency score of all users in the same industry/network using a benchmark module 212 and presented to the user for viewing. This comparison may notify the user may as to how advanced and efficient they are with respect to other users in their industry and/or network.

Once the individual final efficiency score for each social media network 202 is determined, a global efficiency score (hereinafter "user efficiency score") is calculated which reflects the user's efficiency score on all social networks. In one embodiment, a coefficient may be assigned to each social network based on the popularity and the number of members of the social network. The system 200 may calculate the "user efficiency score" in accordance with equation 1 below:

$$(1)\ Global\ Score = a^*sc1 + b^*sc2 + c^*sc3 + d^*sc4$$

Where:
a, b, c, and d are the different coefficients associated with the different social networks 202;
$a+b+c+d=1$; and
sc1 to sc4 are the individual efficiency scores of the user with the different social media networks.

In an embodiment, the system 200 may include a knowledge base 214 for recommending one or more actions to the user to improve their efficiency score by improving their visibility to other users. The knowledge base 214 may be connected to the database 206 to have access to the user's statistical/activity data from each social network 202. The knowledge base may be adapted to obtain the ranking rules of each social network to analyze the statistical data of the user in view of the ranking rules and criterion of each social network 202 to determine the steps that need to be taken to improve the individual efficiency scores of the user with that specific network. The analyzing may include mapping the ranking rules to the activity data (e.g. examining the activity data in light of each rule). In an embodiment, the ranking rules may be examined to determine the most relevant ones. A weight may be assigned to each rule depending on the general relevancy of the rule, or the relevancy of the rule with respect to a specific campaign profile page. The rules may also be re-ordered so that the activity data is analyzed in view of the most relevant rule first to generate recommendations that, when adopted, improve the ranking and/or visibility of the campaign the most.

For example, some social networks penalize the users when they use automated programs for posting contents. Therefore, if the knowledge base 214 detects that some content is being posted automatically (e.g. if multiple postings have occurred at the same time), it may recommend to the user posting contents in their profile manually. In another example, the knowledge base 214 may recommend to post less often if a user has a low amount of comments/likes but a high amount of user posts.

In one example of implementation, the recommendations may be triggered in response to detecting that the efficiency score is lower than a threshold. The threshold may be predetermined, and may also be dependent on the industry score.

In an embodiment, the system 200 updates the activity data in the database 206, and/or the ranking rules in the knowledge base 214 on a regular basis e.g. daily and/or every time a user 208 makes a request, to provide the user 208 with real time (instantaneously) or nearly real time results and recommendations.

For instance, the industry's efficiency score may change depending on the recent activities of other users and the number of users that join or leave the different social networks. Furthermore, the knowledge base's recommendations 214 may also change depending on the latest activities performed by the user and the new rules used by the different social media networks for ranking users. For example, if the knowledge base 214 in the last recommendations suggested that the user completes their profile and the user does before running the last search, the knowledge base 214 would not repeat the same recommendation again. On the other hand, if for example the knowledge base suggested that the user posts the content manually and the ranking rules have changed to stop penalizing users for posting using automated programs, the knowledge base 214 would cease to include the recommendation of posting manually.

As discussed above, the system 200 may be implemented as a server to be accessed remotely by a plurality of clients 208. In an embodiment, measuring and improving the efficiency of social media campaigns is provided as a real time online service (SaaS) in a cloud computing environment, whereby the system 200 remotely connects to both the user 208 and the different social media networks 202 over a communications network 204. An Example of a suitable operating environment for practicing the embodiments is described below.

Figure 4:
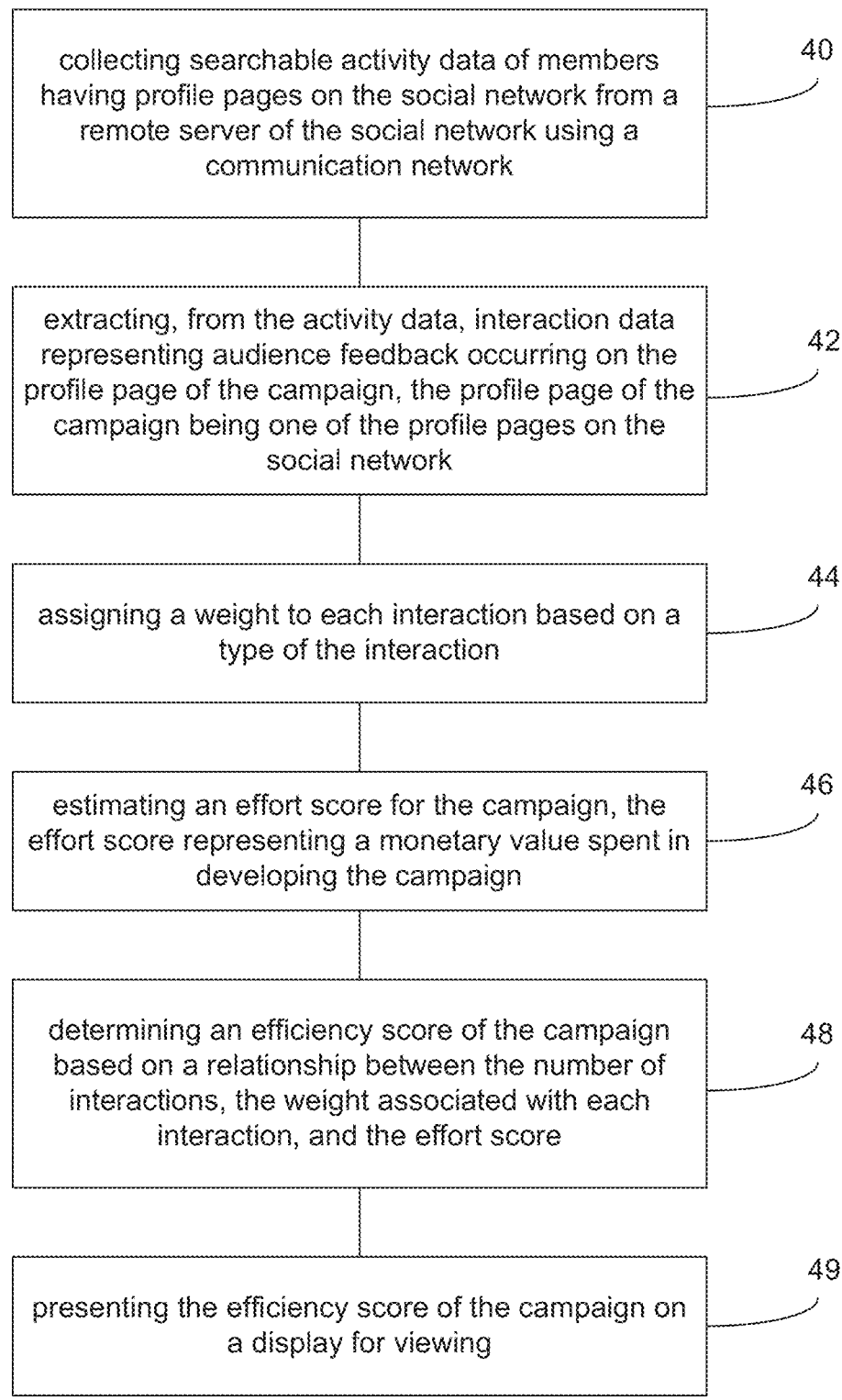
FIG. 4 is a flowchart of a computer-implemented method for measuring an efficiency of a social media campaign (campaign) presented on a profile page on a social network, in accordance with an embodiment.

FIG. 4 is a flowchart of a computer-implemented method for measuring an efficiency of a social media campaign (campaign) presented on a profile page on a social network, in accordance with an embodiment. As shown in FIG. 4, step 50 comprises collecting searchable activity data of members having profile pages on the social network from a remote server of the social network using a communication network. Step 52 comprises extracting, from the activity data, interaction data representing audience feedback occurring on the profile page of the campaign, the profile page of the campaign being one of the profile pages on the social network. Step 54 comprises assigning a weight to each interaction based on a type of the interaction. Step 56 comprises estimating an effort score for the campaign, the effort score representing a monetary value spent in developing the campaign. Step 58 comprises determining an efficiency score of the campaign based on a relationship between the number of interactions, the weight associated with each interaction, and the effort score. Step 59 comprises presenting the efficiency score of the campaign on a display for viewing.

Figure 5:
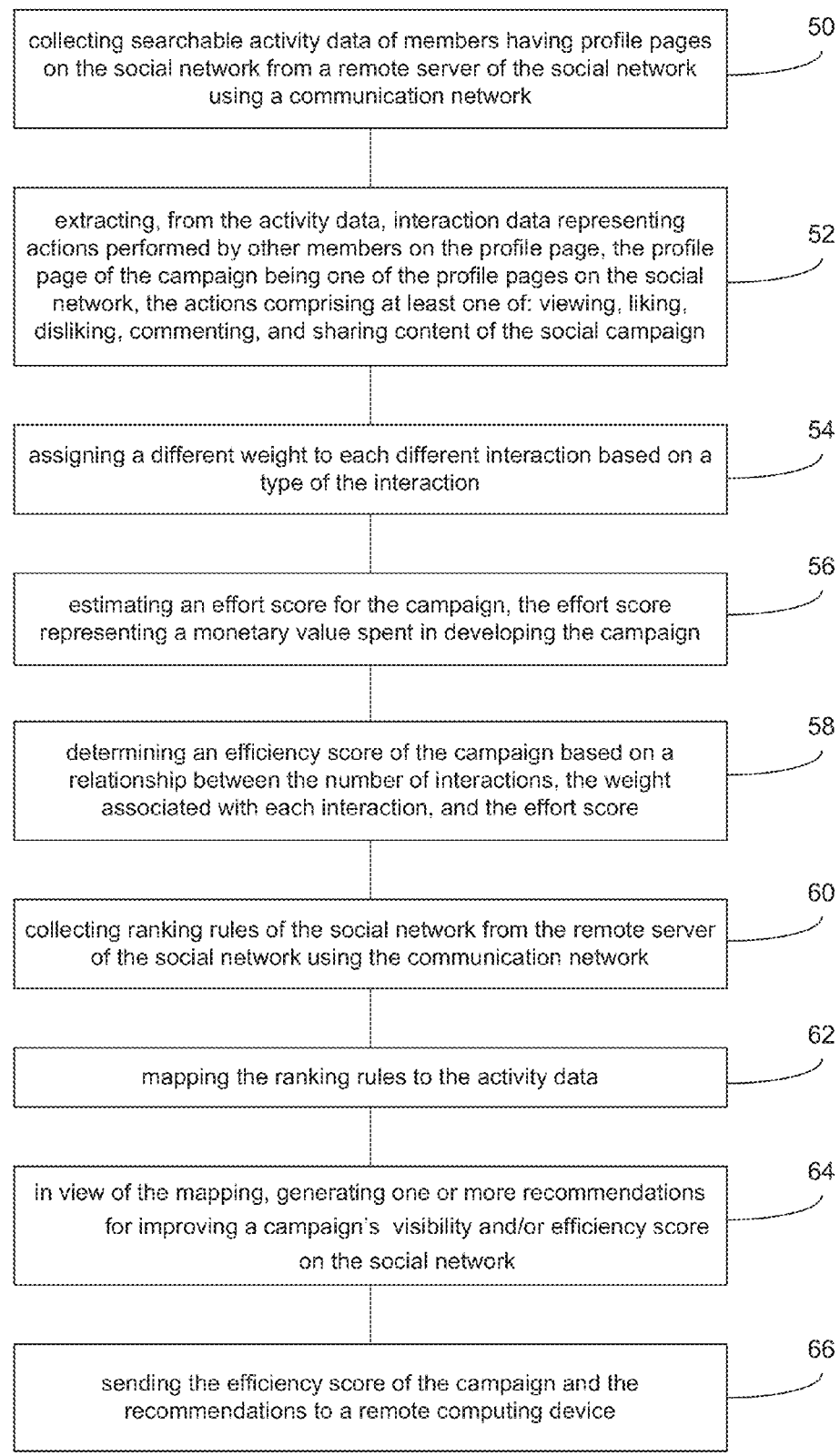
FIG. 5 is a flowchart of a computer-implemented method for measuring an efficiency of a social media campaign (campaign) presented on a profile page on a social network, in accordance with another embodiment.

FIG. 5 is a flowchart of a computer-implemented method for measuring an efficiency of a social media campaign (campaign) presented on a profile page on a social network, in accordance with another embodiment. As shown in FIG. 5, step 50 comprises collecting searchable activity data of members having profile pages on the social network from a remote server of the social network using a communication network. Step 52 comprises extracting, from the activity data, interaction data representing actions performed by other members on the profile page, the profile page of the campaign being one of the profile pages on the social network, the actions comprising at least one of: viewing, liking, disliking, commenting, and sharing content of the social campaign. Step 54 comprises assigning a different weight to each different interaction based on a type of the interaction. Step 56 comprises estimating an effort score for the campaign, the effort score representing a monetary value spent in developing the campaign. Step 58 comprises determining an efficiency score of the campaign based on a relationship between the number of interactions, the weight associated with each interaction, and the effort score. Step 60 comprises collecting ranking rules of the social network from the remote server of the social network using the communication network. Step 62 comprises mapping the ranking rules to the activity data. Step 64 comprises generating, in view of the mapping, one or more recommendations for improving a campaign's visibility and/or efficiency score on the social network. Step 66 comprises sending the efficiency score of the campaign and the recommendations to a remote computing device.

Network and Operating Environment

Figure 2:
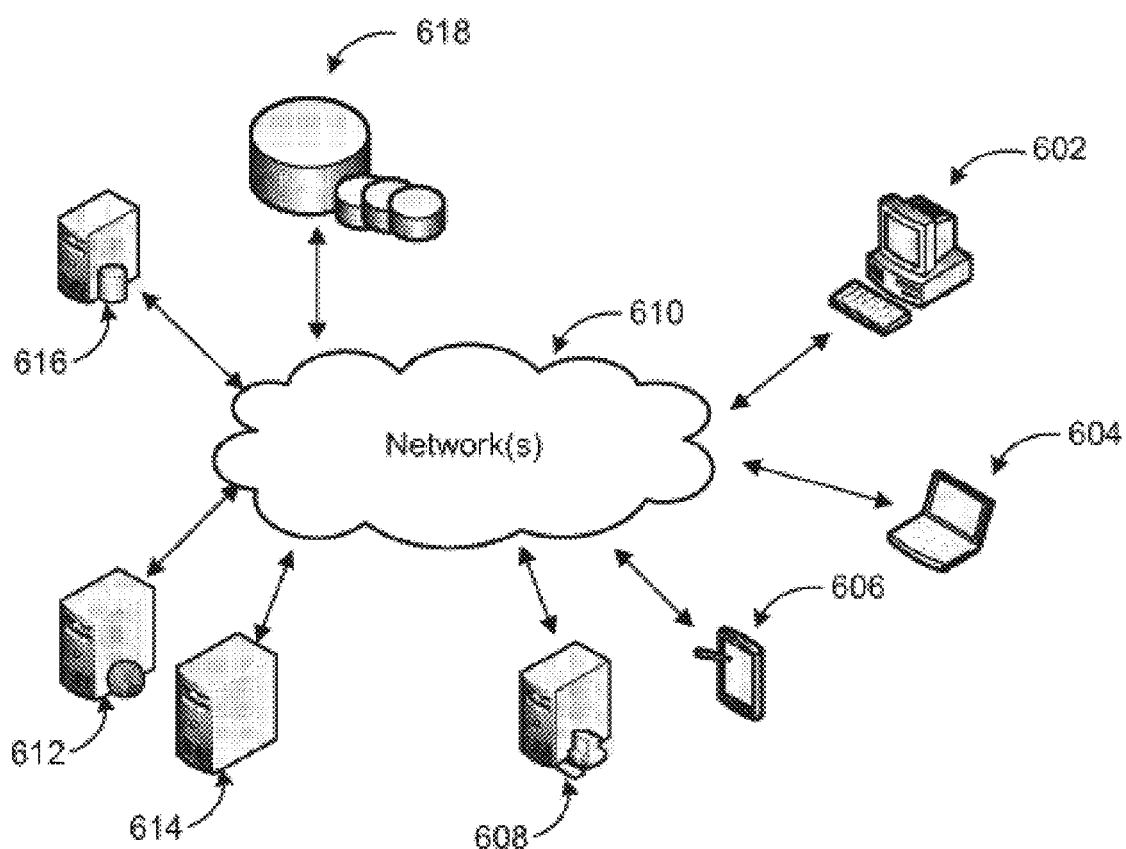
FIG. 2 is an example networked environment, where embodiments may be implemented.

FIG. 2 is an example networked environment, where embodiments may be implemented. Extensible multi-tenant service systems may be implemented in a distributed manner over a number of physical and virtual clients and servers. They may also be implemented in un-clustered systems or clustered systems employing a number of nodes communicating over one or more networks (e.g. network(s) 610).

Such a system may comprise any topology of servers, clients, Internet service providers, and communication media. Also, the system may have a static or dynamic topology. The term "client" may refer to a client application or a client device. While a networked system implementing extensible multi-tenant services may involve many more components, relevant ones are discussed in conjunction with this figure.

Requests for access may come from tenants using individual client devices 602-606 or application server 608 in a networked multi-tenant system. The client device may be one of desktops, laptops, IPADS, IPhones, smart phones, or any computing device having an operating system which can implement the present embodiment.

Such a system may also be implemented, in one or more servers (e.g. servers 612, 614) and accessed by the client devices (or applications). One or more web servers (physical or virtual) such as web server 612 may receive the requests and direct them to the appropriate resource. The resources may include scalable server clusters with synchronous and asynchronous server, organization databases, and other components.

Organization databases may be embodied in a single data store such as data store 618 or distributed over a number of data stores. Dedicated database servers (e.g. database server 616) may be used to coordinate data retrieval and storage in one or more of such data stores.

Network(s) 610 may include a secure network such as an enterprise network, an unsecure network such as a wireless open network, or the Internet. Network(s) 610 provide communication between the nodes described herein. By way of example, and not limitation, network(s) 610 may include wired media such as a wired network or direct-wired connection, and wireless media such as acoustic, RF, infrared and other wireless media.

Many other configurations of computing devices, applications, data sources, data distribution systems may be employed to implement an extensible multi-tenant service platform. Furthermore, the networked environments discussed in FIG. 2 are for illustration purposes only. Embodiments are not limited to the example applications, modules, or processes.

Figure 3:
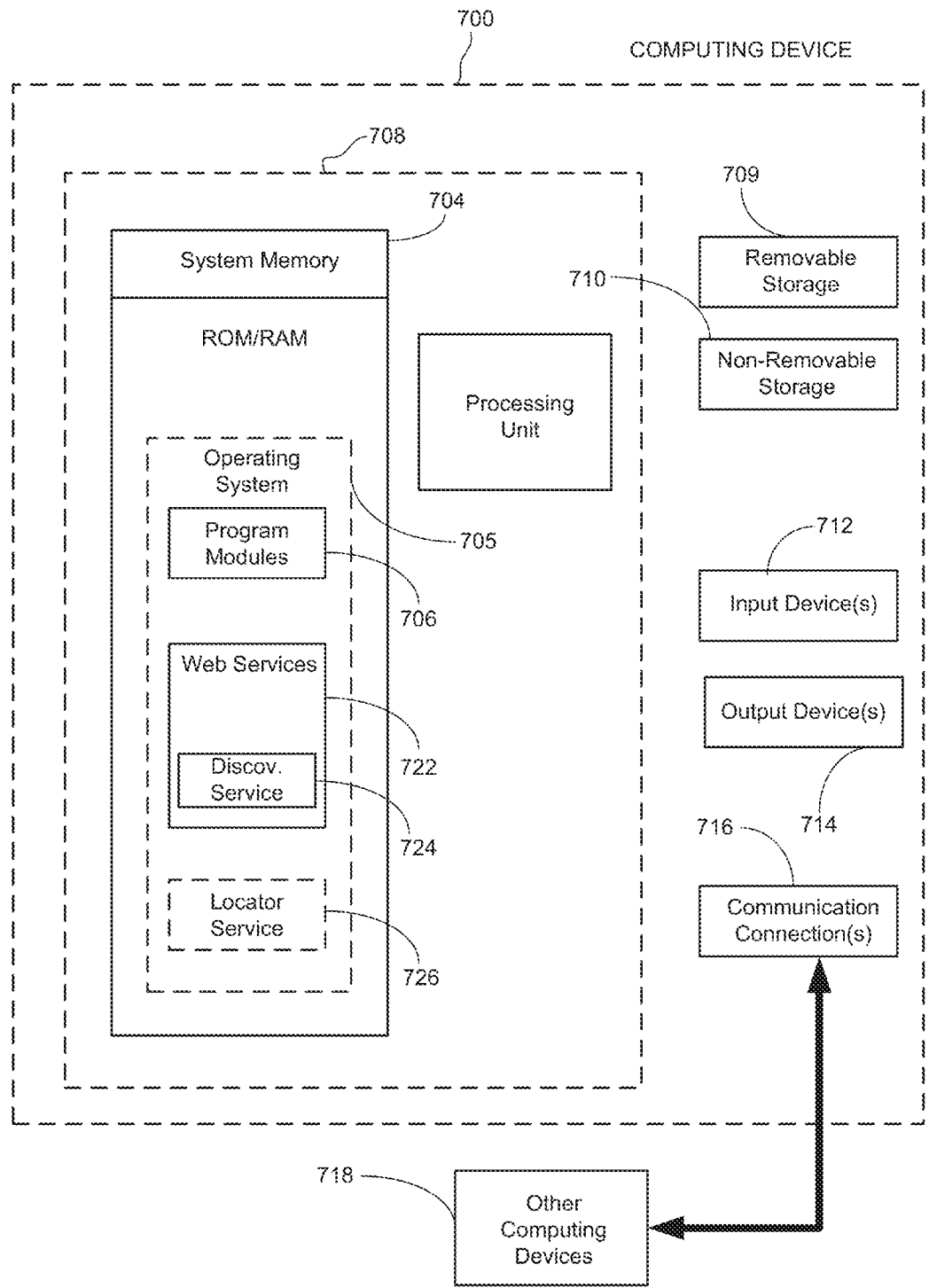
FIG. 3 illustrates a block diagram of an exemplary computing environment.

FIG. 3 and the associated discussion are intended to provide a brief, general description of a suitable computing environment in which embodiments may be implemented. With reference to FIG. 3, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer, such as the WINDOWS® operating systems from MICROSOFT CORPORATION of Redmond, Wash. The system memory 704 may also include one or more software applications such as program modules 706, Web services 722, a discovery service 724 within web services 722, and an optional locator service 726.

Web services 722 may be a separate application or an integral module of a hosted multi-tenant service platform that provides data and processing services to client applications associated with computing device 700. Discovery service 724 may provide location and configuration information associated with individual organization (tenant) services to a client requesting access to those. Optional locator service 726 may provide services associated with determining a purpose of the service and which databases to use for web servers, as well as asynchronous processing servers, as described previously. This basic configuration is illustrated in FIG. 3 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 3 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators. These human operators need not be collocated with each other, but each can be only with a machine that performs a portion of the program.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer-implemented method for measuring an efficiency of a social media campaign (campaign) presented on a profile page on a social network, comprising:

collecting searchable activity data which is publicly available on profile pages associated with members of the social network, from a remote server of the social network using a communication network;

extracting, from the activity data, interaction data representing audience feedback on the campaign;

assigning a weight to each interaction based on a type of the interaction;

estimating an amount of money spent in developing the campaign based on the profile page of the campaign;

determining an efficiency score of the campaign as a ratio between the amount of money and the sum of each interaction multiplied by its weight;

presenting the efficiency score of the campaign on a display for viewing.

2. The method of claim 1 further comprising:

determining an efficiency score for the campaign on more than one social network;

assigning a weight to each social network; and determining a global efficiency score for the campaign, the global efficiency score representing an overall efficiency of the campaign using the efficiency score and the weight associated with each social network.

3. The method of claim 1 further comprising:

determining, using the activity data of all members, an efficiency score for all members in an industry to which the social campaign belongs;

determining an industry efficiency score by averaging the efficiency scores of all members of the industry;

presenting the industry efficiency score concurrently with the campaign efficiency score on a display for viewing.

4. The method of claim 3, wherein upon detecting that the campaign efficiency score is below a predetermined threshold:

collecting ranking rules of the social network from the remote server of the social network using the communication network;

mapping the ranking rules to the activity data;

in view of the mapping, generating one or more recommendations for improving a campaign's visibility and/or efficiency score on the social network.

5. The method of claim 1 further comprising:

collecting ranking rules of the social network from the remote server of the social network using the communication network;

analyzing the activity data in view of the ranking rules;

in view of the analyzing, generating one or more recommendations for improving a campaign's visibility and/or efficiency score on the social network.

6. The method of claim 5, wherein the analyzing comprises mapping the ranking rules to the activity data.

7. The method of claim 6, further comprising weighting the ranking rules in view of their relevancy.

8. The method of claim 7, further comprising re-ordering the ranking rules in view of the weight assigned to each rule, whereby the activity data is analyzed in view of the most relevant rule first.

9. The method of claim 1, further comprising:

performing the steps of extracting, assigning, estimating, determining and presenting in real time, in response to receiving a member request of campaign efficiency score.

10. The method of claim 9, wherein the measuring of the efficiency is provided as a Software as a Service (SaaS) to a remote member using a communication network.

11. The method of claim 1, wherein the interaction data comprises actions performed by other members on the profile page, said actions comprising at least one of: viewing, liking, disliking, commenting, and sharing content of the social campaign.

12. The method of claim 1, wherein the activity data include any one of: viewing, liking, disliking, commenting, sharing, posting new materials, updating profile, commenting on content outside of the social campaign profile page.

13. A system for measuring an efficiency of a social media campaign (campaign) presented on a profile page on a social network, comprising:

an input adapted to collect searchable activity data which is publicly available on profile pages of members of the social network, from a remote server of the social network using a communication network;

a memory for storing the collected activity data for processing;

an intelligence module comprising a processor having access to computer readable instructions which when executed by the processor cause the processor to:
extract, from the activity data, interaction data representing audience feedback on the campaign;
assign a weight to each interaction based on a type of the interaction;
estimate an amount of money spent in developing the campaign based on the profile page of the campaign;
determine an efficiency score of the campaign as a ratio between the amount of money and the sum of each interaction multiplied by its weight;

an output adapted to send the efficiency score to a remote user for displaying on a display device.

14. The system of claim 13, wherein the intelligence module is further adapted to determine an efficiency score for the campaign on more than one social network;
assign a weight to each social network; and
determine a global efficiency score for the campaign, the global efficiency score representing an overall efficiency of the campaign using the efficiency score and the weight associated with each social network.

15. The system of claim 13, wherein the intelligence module is further adapted to:
collect ranking rules of the social network from the remote server of the social network using the communication network;
analyze the activity data in view of the ranking rules;
generate, in view of the analysis, one or more recommendations for improving a campaign's visibility and/or efficiency score on the social network.

16. The system of claim 15, wherein the intelligence module is adapted to map the ranking rules to the activity data.

17. The system of claim 15, wherein the intelligence module is adapted to weight the ranking rules in view of their relevancy.

18. The system of claim 17, wherein the intelligence is adapted to re-order the ranking rules in view of the weight assigned to each rule, whereby the activity data is analyzed in view of the most relevant rule first.

* * * * *